UNITED STATES PATENT OFFICE.

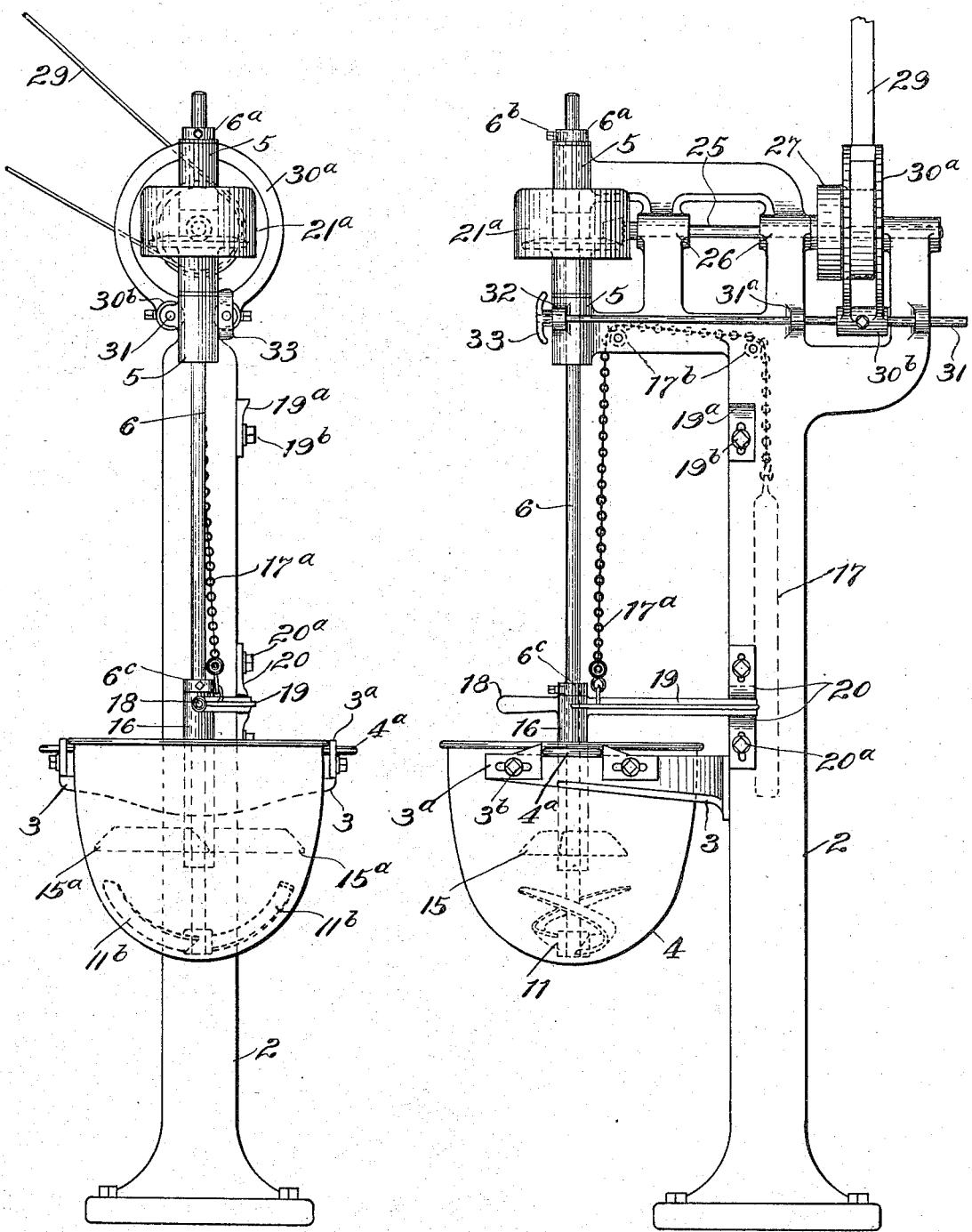

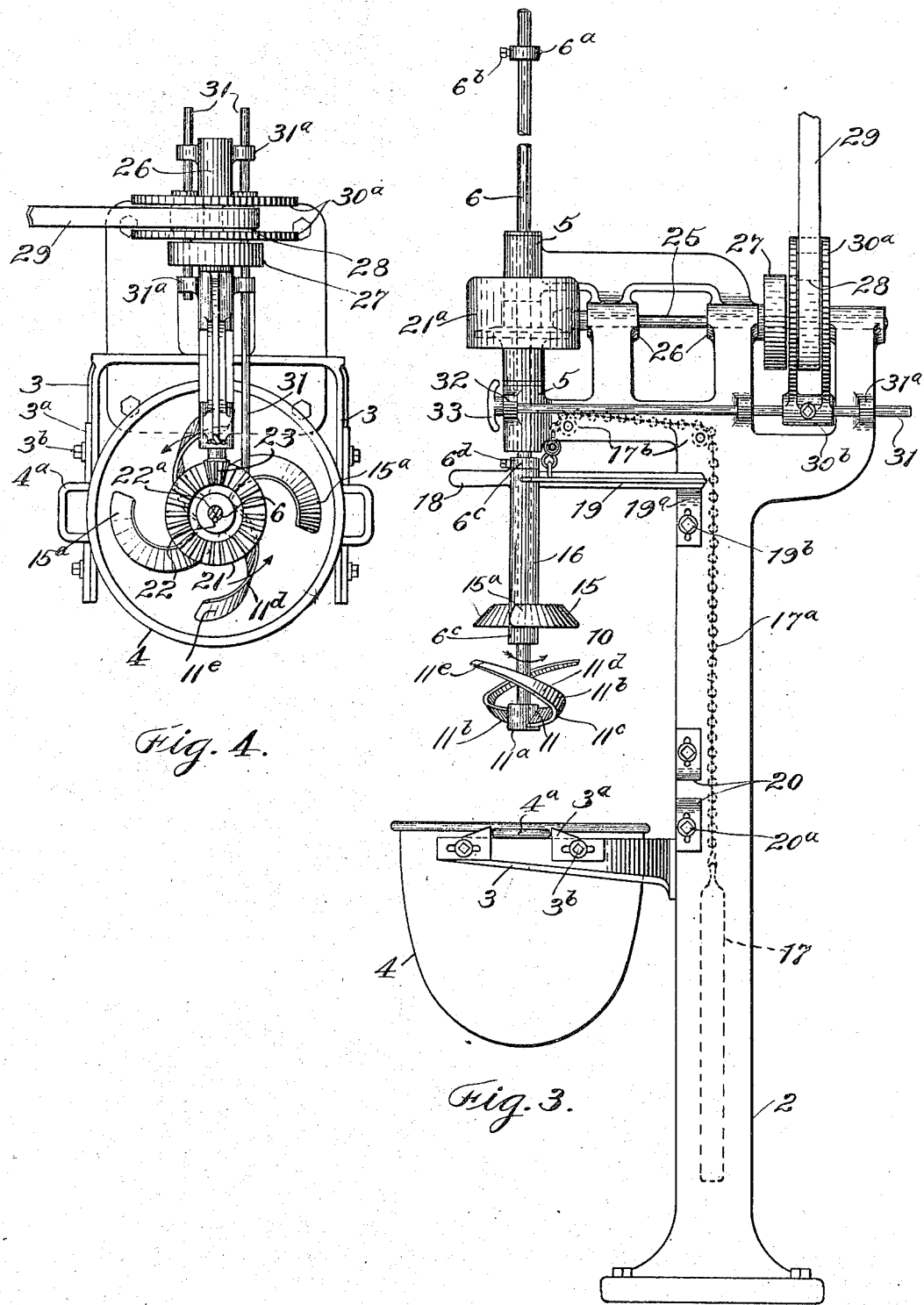

EUSTACE R. KNOTT, OF SHARON, MASSACHUSETTS.

POPCORN-MIXING MACHINE.

1,320,766.      Specification of Letters Patent.      Patented Nov. 4, 1919.

Application filed February 24, 1916. Serial No. 80,272.

*To all whom it may concern:*

Be it known that I, EUSTACE R. KNOTT, a citizen of the United States, residing at Sharon, in the county of Norfolk, State of Massachusetts, have invented a certain new and useful Improvement in Popcorn-Mixing Machines, of which the following is a specification, reference being had therein to the accompanying drawings.

This invention relates to mixing machines, and in particular to machines for stirring and mixing pop-corn and one or more additional substances, the principles of the invention being applicable also in the case of machines used for operating upon other materials.

In the manufacture of confections consisting of popped pop-corn the latter is treated with a sweet or other coating and flavoring, or coloring, or flavoring and coloring constituent. In some instances the coating or coloring constituent is heated to a degree sufficient to render it quite fluid and then associated with the pop-corn in a suitable container. In all such cases a batch of popped corn, together with the added substance or substances, is thoroughly mixed until the popped kernels, or particles of kernels, if the corn is ground, are uniformly coated or imbued. The efficiency of this operation and time of its completion are dependent mainly upon the completeness and rapidity of the circulating movement of the corn, but in part upon the degree of fluidity of the syrup or the like which is combined with the corn. An undesirable incident of the mixing operation is the fact that when mixing whole popped corn, *i. e.*, popped corn which has not been ground, a reduction in bulk of corn is caused by the breakage of the kernels during the mixing process, the proportion of broken kernels varying with conditions and the means by which the mixing is accomplished.

An important object of this invention is to provide means for distributing the flavoring or other medium, hereinafter called the syrup, throughout the pop-corn as quickly as possible and, in case fluidity or other desired condition has been secured by heat, before loss of heat and fluidity or other desired conditions of the syrup, and which means shall be operative to so stir and mix the batch that the kernels or particles shall be evenly and thoroughly coated, colored, etc., and that the mass shall remain light and fluffy. Other objects of the invention are to provide for the cooking of the syrup in the mixing vessel to conserve heat, to mix the batch with a minimum breakage of the corn and loss of bulk, and to obviate hand mixing and effect an economy of material.

It is desirable to provide means for rapidly submerging the kernels or particles of the pop-corn into the syrup in the receptacle while the syrup is in its most fluid state, the advantage of which is that the pop-corn is more completely coated, and therefore will be better protected against absorption of moisture, which tends to cause the pop-corn to deteriorate when kept in stock.

This invention has been evolved for the accomplishment of these ends and to make provision for other objects tending to efficiently and conveniently perform the process of mixing the desired batch of material without beating or splashing.

A feature of the invention is a mixer so devised as to stir and mix the batch in the container with a definite predetermined circulating motion which quickly brings all of the kernels or particles of the corn into the syrup. It accomplishes this result by imparting to the batch a compound gyrating movement during which the material is diverted downwardly, outwardly or centrifugally and upwardly and is then deflected or diverted inwardly or centripetally and downwardly, so that it circulates into and out of the syrup over and over again and the kernels or particles are thoroughly and rapidly mixed. Preferably this is accomplished by means comprising a rotating stirrer adjustable into the syrup in the container and designed to deflect the kernels or particles downward into the syrup, to throw the mass centrifugally, and to impart a whirling or gyrating motion thereto, and a normally stationary device, capable of adjustment according to the size of the batch, for intercepting the upper portion of the mass, and deflecting the intercepted material inwardly and downwardly into the opening which forms in the whirling batch at the center of the container adjacent the axis of operation of the stirrer.

The invention consists further in a mixer which is mounted so as to be readily moved from an idle position to a position in which it may operate to stir and mix a batch of material, and otherwise constructed as well as combined, as hereinafter claimed.

The invention further consists in a machine comprising a suitable support arranged to hold a receptacle, preferably a kettle in which the syrup may be cooked and raised to the desired temperature and brought to the requisite state of fluidity, and a counter-balanced mixing device having relatively movable members which are bodily and simultaneously movable into the kettle containing the batch when adjusted upon the support and includes a driving mechanism whereby the movable member of the stirring device may be actuated.

A mixing machine which is an embodiment of the various features of the invention is shown in the accompanying drawings, in which,—

Figure 1 is a side elevation of said machine showing the mixer adjusted in lower position to operate in the receptacle or kettle on the support.

Fig. 2 is a front view of the machine with the parts in the same position as in Fig. 1.

Fig. 3 is a side elevation of the machine with the mixer and its shaft withdrawn from the receptacle or kettle and latched in its uppermost position and, Fig. 4 is a plan view of the machine with a portion of the upper bearing broken away to show the bevel gearing and with the gear guard omitted.

The machine shown has a vertical standard or column 2 having on its front face a pair of brackets or horizontal, projecting arms 3 upon which may be deposited a removable syrup cooking kettle 4. The upper portion of the column or support 2 is provided with vertically alined bearings 5 in which is slidably mounted a shaft 6 carrying on its lower portion a mixing device 10 which, by means of the shaft 6, is adapted for vertical movement as to the column or support 2 toward or from the kettle 4. For the purpose of conserving heat and to enable the utilization of the heated syrup in the most efficient and economical manner, the kettle 4 is preferably of such a type that it may be utilized to hold the syrup or other substance, with which it is desired to mix the pop-corn, while the syrup is being cooked and to contain the cooked syrup when the kettle is disposed upon the bracket or arms 3 on the standard. In this way the syrup, while in its thinnest state, is rapidly distributed throughout the kernels or particles of pop-corn when agitated and stirred by the mixer 10 when the latter is lowered into position to operate within the heated kettle 4. The heat of the kettle is imparted to the syrup which is thus maintained in a higher state of fluidity than would be the case if the syrup were cooked in a separate device and then poured into another receptacle for use on the mixer support 3.

The kettle 4 is provided with opposite handles 4ª which are adapted to be placed between, and held against shifting movement on the arms 3 by two pairs of oppositely disposed slotted keepers 3ª which are adapted to be secured in adjusted positions on the sides of the arms 3 by fastening screws or other suitable devices 3ᵇ, whereby the kettle 4 may be adjusted centrally in the path of movement of the vertically movable stirrer 10.

It is desirable and important to provide a stirrer of such arrangement, design and construction that it will not only operate to rapidly force the light kernels or particles of pop-corn quickly into the comparatively small quantity of syrup or other medium with which it is intended to coat the kernels but also that the stirrer will operate efficiently with the minimum breaking of the grains or particles of pop-corn. In other words, it is desirable to avoid the crumbling or breaking of the pop-corn kernels for the purpose of obtaining as large an output of finished product from a given batch as is possible. Ordinarily when mixing or stirring whole kernels of pop-corn in a batch, a considerable portion of the kernels are broken or fractured, thus materially reducing the bulk of the finished batch with a consequent loss or reduction in the number of finished cakes, bars, or other pieces of confection into which the batch is finally converted. Therefore, by eliminating the breakage of the pop-corn as much as possible, a larger number of cakes, bars, or other pieces will be obtained from a given batch than when a batch is mixed by any other means which results in a greater loss of bulk due to the fracture and breaking of the kernels of pop-corn. This is accomplished by providing a mixer having a stirrer 11 with a central or hub portion 11ª fastened on the shaft 6 and from which project a plurality of arms 11ᵇ which, in the present instance, are shown as arranged on radially opposite sides of the hub 11ª. The inner portions of the arms 11ᵇ adjacent the hub 11ª are of suitable width and thickness and preferably of rectangular form in cross-section and disposed in angular relation on the hub 11ª so as to incline upwardly and forwardly, as at 11ᶜ, with relation to the direction of rotation of the driving shaft 6. Each arm 11ᵇ is provided with an inclined central portion 11ᶜ, and an outwardly curved or volute end portion 11ᵈ, and is twisted intermediately the inner portion 11ᶜ and its end 11ᵉ so as to present a forwardly and upwardly inclined surface at 11ᵉ which reacts upon the material of the batch, when the shaft 6 is driven, to throw the material centrifugally and upwardly in the kettle 4.

In other words, each arm 11ᵇ of the stirrer is substantially volute in form, or direction of curvature in plan view, and both the arms are curved outwardly and upwardly from the common hub 11ᵃ in the form, substantially, of a helix. When the mixer 10 is lowered by and with its shaft 6 into the kettle 4 and the stirrer 11 is rotated, the faces 11ᶜ being inclined upwardly and forwardly, as to the direction of rotation, tend to react on the adjacent material of the batch about the hub 11ᵃ to force the grains downwardly into the fluid or syrup and cause them to be quickly submerged and then forced forwardly, outwardly and upwardly.

Preferably the arms of the stirrer 11 are given a curvature, indicated in dotted lines in Fig. 2, to conform approximately to the curvature of the inner surface of the kettle 4 and may be adjusted downwardly to a proper or desired distance from the bottom of the kettle 4 to operate without contact therewith by the lowering of the shaft 6. An adjustable collar 6ᵃ on the upper end of the shaft is adapted to rest on the upper bearing 5 of the support and be secured by a set screw 6ᵇ to hold the mixer at the desired position.

For the purpose of increasing the rapidity and aiding the direction of circulation of the grains of pop-corn in the batch the mixer includes a deflector 15 which, also, is mounted upon the shaft 6 and is disposed in a position thereon to divert the material above the upper swinging ends 11ᵉ of the stirrer arms 11ᵇ, and is adjustable along the shaft 6 toward or from such arms. The deflector 15 in the form shown comprises a pair of opposite arms 15ᵃ which are secured at or formed at their inner ends on a sleeve 16 against which set collars 6ᶜ are relatively adjustable. The collars 6ᶜ may be set at the desired positions on the shafts 6 to permit the deflector 15 to be turned relatively on the shaft without longitudinal or endwise movement, the collars being provided with set screws 6ᵈ for fastening them in the desired positions. The deflector arms 15ᵃ radiate outwardly from the hub or sleeve portion 16 and their outer ends curve oppositely to the direction of rotation of the stirrer 11, as indicated in the plan view, Fig. 4, so as to divert the material centrally and downwardly toward the central zone of operation of the rotating stirrer arms 11ᵇ. This interception, deflection and diversion of the material agitated and rotated by the stirrer 11 is further accelerated by designing and forming the deflector arms 15ᵃ with an inclined face presented toward the rotating material of the batch which inclined face so reacts on the material of the batch as to quickly change its direction of flow and throw it centrally and downwardly. In the form shown the deflector arms 15ᵃ comprise essentially semi-circular blades each of which is inclined conically. To provide for the efficient operation of the mixer 10 upon batches of different size in the kettle 4 the deflector 15 is adapted to be longitudinally adjusted upon the shaft 6 or moved co-axially toward or from the upper swinging ends of the stirrer arms 11ᵇ as may be required. For instance, when a small batch is to be stirred the said collars 6ᶜ are loosened on the shaft 6 and mutually adjusted downwardly to permit the downward adjustment of the deflector sleeve 16 along the shaft, so that the deflector arms 15ᵃ will lie in a plane just above the top of the batch in the kettle when the stirrer 11 is not rotating and in which position the arms 15ᵃ of the deflector will be enabled to react upon the swirling material of the bath when the stirrer 11 is actuated. When a larger batch is introduced into the kettle 4 the deflector 15 is raised or adjusted upwardly on the shaft 6 so as to just clear the top of the batch when the stirrer 11 is idle and to be in a position to intercept the upper portion of the batch when it is whirled by the rotating stirrer 11.

To aid in the vertical adjustment of the stirrer 10 and the shaft 6 upon which it is mounted with relation to the kettle 4, this mechanism is preferably counter-balanced, the counter-balance including a weight 17 which is vertically movable in the standard or support 2, which is preferably hollow. The upper end of the weight 17 is connected to a chain or equivalent flexible device 17ᵃ adapted to run over a set of guide pulleys 17ᵇ, mounted in the upper portion of the support 2, and is connected to an adjacent upper portion of the deflector sleeve 16. The vertical movement of the shaft 6 and the mixer 10 is facilitated by providing the sleeve 16 with a forwardly projecting handle 18 which also provides means whereby the sleeve 16 and the deflector arms 15ᵃ may be turned as to the shaft 6 as occasion may arise during the operation of the mixer to permit the operative to examine the action or condition of the batch in the kettle 4. That the mixer 10 may be safely maintained in either of its positions with respect to the kettle 4, a suitable latching device is provided and consists of a horizontally disposed lever arm 19 projecting rearwardly from and secured to the upper end of the deflector sleeve 16. The rear and swinging end of the lever 19 is adapted to engage and rest upon an upper slotted cleat or keeper 19ᵃ adjustably secured on the upper portion of the hollow support 2 by fastening screw 19ᵇ. When the stirrer 10 has been vertically moved and withdrawn from the kettle 4, the lever 19 is swung over the rest 19ᵃ, serving to safely latch the vertically adjustable devices in their uppermost position. When the stirrer is adjusted downwardly and in operating position within the kettle 4 the lever arm 19 is adapted to interlock between a pair of opposed, slotted keepers or rests 20 which may be fastened in the desired, respective positions by means of screws 20ª provided on the support 2 intermediate its length and at such position with respect to the kettle supporting brackets 3 as to provide for the necessary amount of adjustment to hold the stirrer 11 in the requisite position adjacent the bottom of the kettle 4 as will be determined by the size of the kernels or particles of the pop-corn of which the batch in the kettle may be composed. The upper and lower keepers 20 operate to efficiently retain the mixer 10 as a whole in its proper position in the kettle against the resistances and reactions which may be created during the mixing or stirring of the batch in the kettle.

As before stated, the stirrer shaft 6 is longitudinally slidable in its bearings 5 on the head of the support 2 and is driven by a suitable driving mechanism, here shown as consisting of a bevel gear 21, with a key 22 engaging a feather-way or spline 22ª, Fig. 4, in the shaft 6 and which provides for the longitudinal relative movement of the shaft and for imparting rotative movement thereto by power derived from a pinion 23 secured on the forward end of a horizontal shaft 25 mounted in bearings 26 formed in the head of the column 2. The gears may be covered by a guard 21ª. Starting and stopping of the operation of the machine may be readily controlled through means of a loose and tight pulley structure in which a pulley 27 is fast on the shaft 25 arranged parallel and adjacent to which is a loose pulley 28 on which latter is shown, in Figs. 3 and 4, a driving belt 29 deriving power from any suitable driver, not here shown. The belt 29 is adapted to be shifted from one of the pulleys to the other by means of a belt shipper comprising a pair of parallel belt-engaging rings 30ª which project upward from and are secured to a transverse slide or hub structure 30ᵇ in which are secured parallel slide rods 31 disposed on opposite sides of the head of the column 2 and slidably mounted in bearing lugs 31ª, Figs. 3 and 4. One of the parallel belt shifter rods 31 is considerably longer than the other and projects forwardly and is supported at its front end in a bearing 32 and has on its outer front end a handle 33 whereby the belt shipper may be moved rearwardly or forwardly to change the position of the belt 29 from one to the other of the pulleys 27, 28. The relative longitudinal movement of the stirrer shaft 6 is provided for by the splining of the bevel gear 21 thereon and by which the shaft 6 may be rotated while it is in any of its relative longitudinal positions.

The operation of the machine is substantially as follows:—

Assuming that the mixer 10 has been raised to its uppermost position as shown in Fig. 3 by the operative, if the kettle 4 is used to cook the requisite quantity of syrup in the kettle, the kettle will be removed from its rests on the support 2 and placed on a suitable stove until the syrup has been heated to the requisite temperature and brought to the desired state of fluidity when the kettle may then be returned to the mixer and properly adjusted upon its rests or arms 3. After the kettle has been placed upon the support the batch of pop-corn or other material to be mixed or stirred with the syrup is then dumped into the kettle 4 and the stirrer 10 is then lowered, the operative proceeds to adjust the deflector 15 above the stirrer according to the height of the bevel of the batch in the kettle at which position the said collars 6ᶜ are again fastened on the shaft 6 by their set screws 6ᵈ in such manner as to allow the shaft to rotate freely within the stirrer sleeve 16 thus permitting the latter also to be turned when required through means of the handle 18. After the mixer members have been properly adjusted with relation to the bottom of the kettle and in correspondence with the quantity of material to be stirred the operative then shifts the belt shipper by grasping the handle 33 and pulling it forwardly, thereby through means of the belt shipper rings 30ª drawing the belt 29 forwardly onto the fixed pulley 27 on the shaft 25, causing the rotation of the stirrer shaft 6 and the stirrer. As the stirrer 11 rotates the light and fluffy pop-corn above the heavier liquid medium or syrup in the bottom of the kettle will be gradually agitated and stirred with a whirling motion, and that portion of the material which lies in front of the forwardly and upwardly inclined faces 11ᶜ will be immediately thrown downwardly toward and into the syrup and quickly submerged and the faces 11ᵈ and 11ᵉ of the stirrer will operate to push the material forwardly and upwardly and outwardly with a rotating motion. The centrifugal force imparted to the material comprising the batch tends to force it upwardly along the spherical inner surface of the bottom of the kettle 4 and for the purpose of accelerating the falling and return movement of the mass toward the center of the stirrer and bottom of the kettle the deflector arms 15ª are therefore so adjusted, designed and disposed as to intercept the upper portion of the rotating mobile or semi-plastic mass and plow, scoop, or deflect the material inwardly and downwardly in an accelerated showering motion. The action of the rotating stirrer which throws the material upwardly and outwardly and centrifugally and the reaction of the relatively stationary deflector combine to impart to the rotating material of the batch a circulation and re-circulation of the particles outwardly and upwardly, and downwardly and centrally so that the pop-corn kernels or grains are very quickly caused to move into contact with and be coated by the syrup in the bottom of the kettle 4. It will be observed that the advantage of utilizing the kettle 4 to cook the syrup is that the heat retained in the metal of the kettle is useful in keeping up the temperature of the syrup and thus keeping it longer in a very thin fluid state and enables the use of a smaller quantity of syrup to coat a given batch of pop-corn kernels or grains than would be the case if the syrup could not be cooked to so high a temperature and which could not be mixed as rapidly as is possible by the present construction of mixer. In addition to this economy of syrup in mixing a given batch of material, a further advantage accrues by reason of the fact that there is a comparatively small reduction of the bulk due to breakage of the pop-corn kernels and this results in the production of a larger number of completed cakes, or other pieces of confection into which the batch is subsequently compressed.

As a result of the vertically movable mixing structure being counterbalanced the operative may at will and with ease raise or lower the mixer to examine the condition of the batch in the kettle 4 and for the purpose of further providing for the examination of the material in the kettle the relatively stationary deflector 15 may be rotated, while the stirrer is being actuated, by means of the handle 18a.

I claim as my invention:—

1. A rotary mixer and stirrer comprising essentially means for imparting a combined downward, outward, and rotary motion to the lower portion of the batch, and means for causing a combined inward and downward movement of the upper portion thereof.

2. A mixer for stirring and mixing a batch of mobile material, comprising a rotary stirrer adapted for adjustment into and out of a receptacle for the batch and having arms shaped to direct the adjacent material downward, upward and outward and impart to the batch a rotary motion, and a deflector with arms set opposed to the direction of rotation of the batch and shaped to divert the upper portions of the batch downwardly and centrally.

3. A device for stirring and mixing a batch of material, comprising a rotary stirrer with volute, helical arms curved in symmetrical direction for lifting and imparting a rotary movement to the material of the batch, and a relatively stationary deflector adapted for adjustment relative to the stirrer to intercept and divert the upper portion of the rotating material centrally and downwardly.

4. A mixer for stirring and mixing a batch of material, comprising a rotary stirrer with opposite, helical, volute arms adapted to cut and impart rotary motion to a batch in its container, and a relatively stationary deflector having arms curved in a direction opposite to the movement of the stirrer and coöperating therewith to impart a circulatory mixing movement to the material in combination with the rotary motion.

5. A mixer for stirring and mixing a batch of materal, comprising a rotary stirrer having arms inclined forwardly and upwardly in the direction of rotation and operative to direct the contiguous portions of the material downwardly and which arms are also curved spirally so as to throw the material upwardly and outwardly, and a deflector with inclined surfaces arranged to intercept and divert a portion of the agitated, rotating batch downwardly to be again thrown outward by the stirrer arms to produce a repeated circulation from and toward the center of the stirrer.

6. In a mixing machine, in combination, a mixing kettle having a concave bottom, and a rotary stirrer with blades approximately conforming to the shape of the kettle and adapted to mix the batch by forcing the material downwardly and centrifugally and diverting it centripetally to the central zone of the stirrer.

7. In a mixing machine, in combination, a cooking kettle for containing a fluid medium and other material to be coated therewith, a rotary stirrer presenting surfaces whereby a portion of the material is directed downward into the fluid medium and also having surfaces for producing a rotary and upward motion to the material, and a device for deflecting and diverting the upwardly moving material inwardly and downwardly toward the fluid and into the path of movement of the central portion of the stirrer.

8. A mixer substantially such as described, comprising a rotary stirrer having faces for producing an outward and upward movement of the batch to be mixed, a deflector disposed to intercept the material moved by the stirrer and adjustably mounted with respect thereto.

9. A mixer substantially such as described, comprising a deflector with a plurality of radiating arms, a coaxial relatively revoluble stirrer, and means providing for the relative axial adjustment of the said deflector and the said stirrer.

10. A mixing machine having, in combination, a support for a portable batch receptacle, and a counter-balanced mixing device including a rotative stirrer and a non-rotative deflector mounted on the support and movable toward or from the receptacle position on the support.

11. A mixing machine having, in combination, a support for a batch receptacle, a device for stirring and mixing a batch including a rotary stirrer and a coaxial, normally stationary deflector movable together axially into operative position in a batch in the receptacle, and counter-balanced on the support, and driving means on the support for the stirrer.

12. A mixing machine having, in combination, a stirrer having opposite upwardly directed, helical, radial arms, a vertically movable driving shaft to which the stirrer is secured, and a deflector turnably mounted on the shaft and longitudinally adjustable thereon toward or from the stirrer.

13. In a mixing machine, in combination, a support having rests for holding a portable kettle, a rotative mixer shaft slidably mounted on the support, a stirrer secured on the shaft for movement thereby into or out of a batch to be stirred and mixed in the kettle, and a deflector adjustably mounted concentric with the shaft above the stirrer and turnable relative thereto.

14. A mixer for stirring and mixing a batch in a receptacle, comprising a rotary stirrer and a deflector movable into positions to stir the batch in the adjacent receptacle and readily removable from operating position therein, and means for retaining the mixer in its positions respective to the receptacle.

15. In a mixing machine, in combination, a stirrer, a shaft on which the stirrer is secured for rotation and for movement toward or from the mixing position, means for driving the shaft and permitting of relative change of position, and a lever operatively combined with the shaft adapted to turn relative thereto, and held against longitudinal movement thereon for shifting the shaft and arranged to support the shaft and the stirrer thereon in relative adjusted position.

16. In a mixing machine, in combination, a support, a shaft slidably and rotatively mounted on the support, a stirrer secured to the shaft, a sleeve loosely mounted on the shaft and adapted for longitudinal adjustment thereon, a deflector attached to the sleeve and adjustable thereby with respect to the stirrer, and a lever attached to the sleeve for longitudinally moving the shaft and the stirrer thereon, and for latching the shaft in its adjusted position and for preventing rotation of the deflector on the shaft.

In testimony whereof I affix my signature in presence of two witnesses.

EUSTACE R. KNOTT.

Witneses:
   CHAS. F. RANDALL,
   ELLEN O. SPRING.